(12) United States Patent
Shimazaki et al.

(10) Patent No.: US 7,755,855 B2
(45) Date of Patent: Jul. 13, 2010

(54) LENS BARREL AND ELECTRONIC IMAGING DEVICE USING THE SAME

(75) Inventors: Yasunari Shimazaki, Hino (JP); Takahiro Kaneta, Hino (JP)

(73) Assignee: Olympus Imaging Corp., Tokyo (JP)

( * ) Notice: Subject to any disclaimer, the term of this patent is extended or adjusted under 35 U.S.C. 154(b) by 16 days.

(21) Appl. No.: 12/355,051

(22) Filed: Jan. 16, 2009

(65) Prior Publication Data

US 2009/0190240 A1 Jul. 30, 2009

(30) Foreign Application Priority Data

Jan. 18, 2008 (JP) ................................. 2008-9604
Dec. 8, 2008 (JP) ............................ 2008-311894

(51) Int. Cl.
*G02B 9/34* (2006.01)

(52) U.S. Cl. ...................................... 359/774; 359/740

(58) Field of Classification Search ................. 359/687, 359/740, 774

See application file for complete search history.

(56) References Cited

U.S. PATENT DOCUMENTS 7,477,840 B2 * 1/2009 Nomura et al. ................ 396/55

FOREIGN PATENT DOCUMENTS

| JP | 2004252200 | 9/2004 |
| JP | 2008048220 | 2/2008 |
| JP | 2008170650 | 7/2008 |

* cited by examiner

*Primary Examiner*—Joseph Martinez
(74) *Attorney, Agent, or Firm*—Volpe and Koenig P.C.

(57) ABSTRACT

The inventive lens barrel comprises: a first group frame 12 retaining the first group lens 21 with a positive refractivity and being movable on the optical axis; a second group frame 11 retaining the second group lens 22 with a negative refractivity and being movable on the optical axis; a third group frame 10 retaining an aperture diaphragm 10b and the third group lens 23, and being movable on the optical axis and pivotable perpendicular to the optical axis in such a manner that the third group frame 10 can move the aperture diaphragm 10b and the third group lens 23 to the position on the optical axis O in a imaging standby state, in which the lens barrel 1 is extended, and move them to the position out of the optical axis O in the retracted state, in which the lens barrel 1 is shortened; and, a fourth group frame 13 retaining the fourth group frame 24 with a positive refractivity, and being movable on the optical axis, and being arranged such that it can retract the aperture diaphragm 10b and the third group lens 23 to a space between the object side end of the second group image side lens of the second group lens 22, which has a relatively smaller outer shape, and the image side end of the fourth group lens 24, in view from the direction perpendicular to the optical axis, under the retracted state.

7 Claims, 10 Drawing Sheets

LENS BARREL AND ELECTRONIC IMAGING DEVICE USING THE SAME

CROSS-REFERENCE TO APPLICATIONS

The present application claims the priorities of Japanese Patent Application No. 2008-9604 filed on Jan. 18, 2008 and Japanese Patent Application No. 2008-311894 filed on Dec. 8, 2008, which are herein incorporated in their entirety for reference.

FIELD OF THE INVENTION

The present invention relates to a lens barrel and an electronic imaging device using the same.

BACKGROUND OF THE INVENTION

Conventionally, a lens barrel telescopically adjustable in its whole length in a direction of optical axis is in practical and widespread use. Such a lens barrel can be expanded and contracted between an imaging standby position, in which the lens barrel expands forward from its applied camera body, and a retracted position, in which the lens barrel is shortened than the imaging standby position and stored in the camera body.

In such an extensible lens barrel, under the retracted position, part of lens group of an imaging optical system generally retracts from the imaging light path. (For example, refer to JP2008170650A.)

Recently, electronic imaging devices acquiring electronically still and moving images, such as digital cameras, are also widely spread, which comprise imaging elements, such as CCD (Charge Coupled Device) and the like, for receiving optical images (subject images) formed by an imaging optical system and photo-electrically converting them into image data. Moreover, such an electronic imaging device, has been proposed, that comprises an image blur compensating device for compensating image blur resulting from camera shake by displacing the imaging elements within a plane parallel to a light receiving plane (for example, JP2008048220A).

As disclosed in JP2008170650A, it should have a group of retraction lenses with small apertures, which are located nearby an aperture diaphragm in the imaging position if part of the lens group of the imaging optical system should be retracted from the imaging light path, for saving a retraction space, and then reducing a size of the lens barrel in a radial direction thereof.

However, in a retracted position, each lens of the groups located around the retraction lenses in the imaging standby position usually approaches each other due to shortening of the lens barrel. Moreover, these lenses are located relatively far from the aperture diaphragm in the imaging standby position, so that these lenses generally have larger apertures than those of retraction lens group, and the more parting far from the retraction lenses, the larger lens aperture is. Thus, if a lens group on the object side relative to the retraction lens group includes two lenses in the imaging standby position, one of the lenses on the object side will have larger aperture than the other lens on the imaging side.

If the retracting space for the retraction lens group is configured to allow at least a part of a lens with largest aperture among those lenses located nearby the retraction lenses in the imaging standby position, to be present in the space in the radial direction, the size of the lens barrel in the radial direction will become larger, and as a result, it will be concerned that a camera body comprising such a lens barrel will also become larger.

In addition, in the lens barrel disclosed in JP2008170650A, the image side end of the retraction lenses in the retracted position are more extending toward the imaging element than the image side end of the lens group located nearby the imaging elements in the imaging standby position.

Therefore, the lens barrel disclosed in JP2008170650A is not easily applied to an electronic imaging device comprising an image blur compensating device, such as a device disclosed in JP2008048220A, because a lens frame for the retaining retraction lens group and a retracting mechanism for the retraction lens group and the like interfere with the image blur compensating device in the retracted position.

BRIEF SUMMARY OF THE INVENTION

Therefore, in view of such circumstances, the object of the present invention is to provide with a lens barrel and an electronic imaging device using such a lens barrel, in which the size of the lens barrel in a radial direction can be reduced, the camera body can be downsized, and simultaneously, said lens barrel is easily applied to an electronic imaging device comprising a blur compensating device.

The first aspect of the lens barrel according to the present invention for achieving above object is characterized by an extensible lens barrel comprising:

a first group frame retaining a first group lens with a positive refractivity, and being movable in a direction of an optical axis;

a second group frame retaining a second group lens with a negative refractivity at an imaging side of the first group lens on the optical axis, and being movable in the direction of the optical axis;

a third group frame, retaining an aperture diaphragm and a third group lens with a positive refractivity, and movable in the optical axis and pivotable in the direction perpendicular to the optical axis in such a manner that said aperture diaphragm and said third group lens can be positioned at the imaging side on the optical axis in a imaging standby state, and said aperture diaphragm and said third group lens are retracted to a position out of the optical axis, in the retracted state in which the length of the lens barrel is shorter than that of in imaging standby state; and a fourth group frame retaining a fourth group lens with a positive refractivity and being movable in the optical axis direction at the imaging side of the third group lens on the optical axis in the imaging standby state; and, said second group lens comprising at least two lenses, namely a second group object side lens and a second group imaging side lens having an outer shape smaller than that of the second group object side lens; said fourth group lens comprising lenses with an outer shapes smaller than that of the second group object side lens;

said aperture diaphragm and said third group lens being so arranged as to retract into the position between the object side end of the second group image side lens and the image side end of the fourth group lens.

The second aspect of the invention is characterized by the lens barrel according to first aspect of the invention wherein the third group lens is arranged such that the image side end of the third group lens is retracted into the position substantially aligned with the image side end of the fourth group lens in the retracted state, in viewing from a direction perpendicular to the optical axis.

The third aspect of the invention is characterized by the lens barrel according to the first aspect of the invention comprising:

a second frame member located behind a first frame member forming the second group frame and being movable along the direction of the optical axis relative to the first frame member;

a third frame member disposed between the first frame member and the second frame member and having an opening to allow undesired light beams to pass therethrough from the front side toward the second frame member, which third frame member is movable in the direction of the optical axis relative to the second frame member, and movable apart from the second frame member in the direction along the optical axis relative to the second frame member in the imaging standby state, and which is located closer to the second frame member in the retracted state than in the imaging standby state;

a first flexible member, which is disposed in front of the third frame member and fixed to the second frame member so as to close the opening in the imaging standby state and so as to be bent by making contact with the first frame member in the retracted state;

a second flexible member, which is fixed to the third frame member so as to be located just behind the first flexible member in the optical axis direction for overlapping with the first flexible member to close at least a part of the opening in the imaging standby state, and for overlapping and making contact with the bending edge of the first flexible member in the retracted state.

The fourth aspect of the invention is characterized by the lens barrel according to the third aspect of the invention wherein the opening is provided for avoiding the interference with the components out of the optical axis within the lens barrel.

The fifth aspect of the invention is characterized by the lens barrel of the third aspect of invention wherein the second frame member is provided with a fourth frame member comprising the third group frame in such a manner that that said fourth frame member is pivotable between the position on the optical axis and the position out of the optical axis, and shifting from the imaging standby state to the retracted state, the fourth frame member is transferred from the position on the optical axis to the position out of optical axis so as to make contact with the second flexible member and to bend the same.

The sixth aspect of the invention is characterized by the lens barrel of the third aspect of the invention wherein the second flexible member can restore the first flexible member to its state before the deformation upon shifting to the imaging standby state.

Moreover, the seventh aspect of the invention for achieving above purposes is characterized by an electronic imaging device comprising:

the lens barrel of the first aspect;

an imaging element disposed in an imaging side of the fourth group lens on the optical axis for generating an image data by receiving images through the first group lens, the second group lens, the third group lens, and the fourth group lens; and, an image-shake compensating device for performing an image-shake compensating action by displacing the imaging element in the plane parallel to a light receiving plane of the imaging element.

DESCRIPTION OF THE PREFERRED EMBODIMENTS

An embodiment of the present invention in case of applying to an electronic imaging device will now be described as an example, in reference to FIGS. 1-10.

Figure 1:
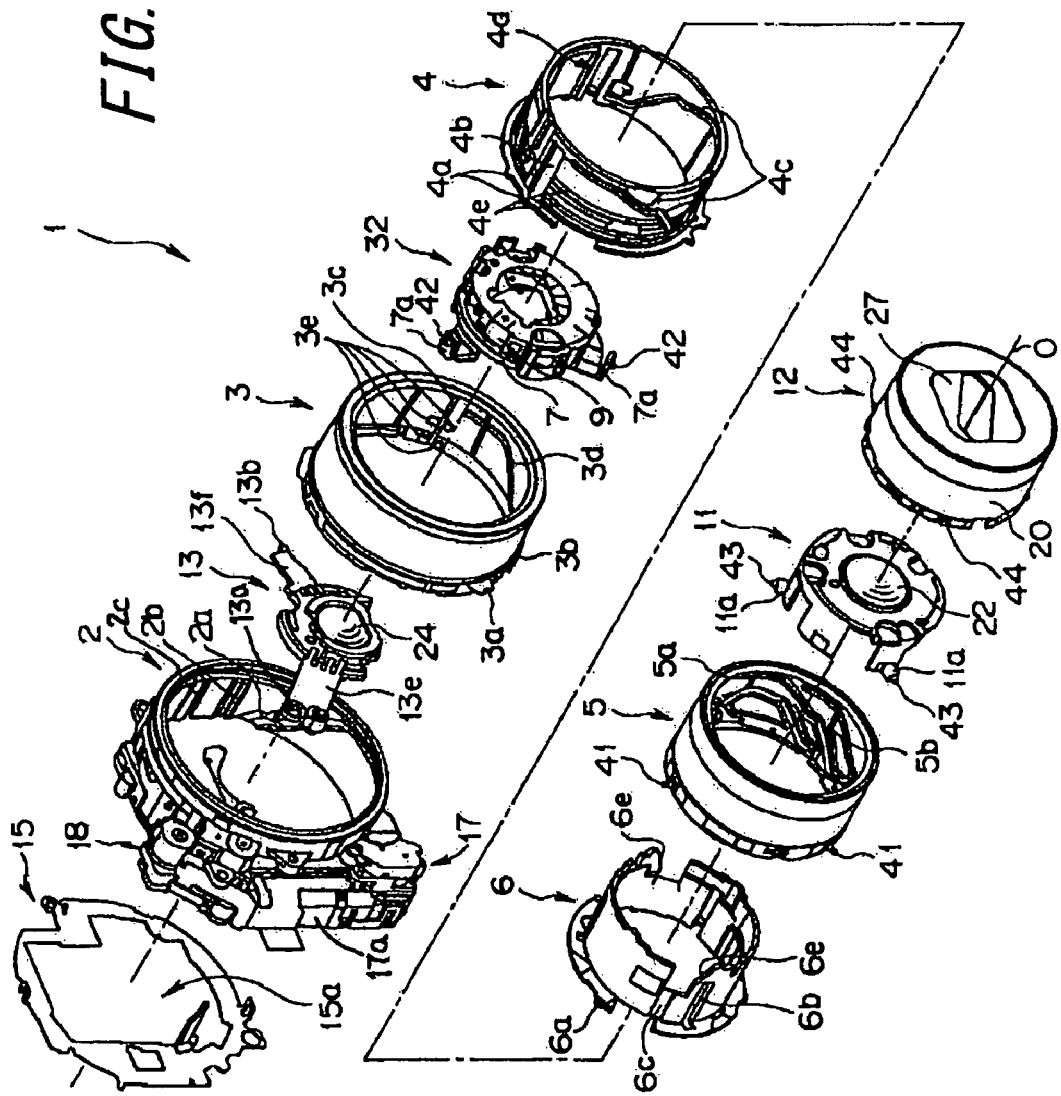
FIG. 1 is an exploded perspective view showing an arrangement of a lens barrel, according to an embodiment of the present invention.
Figure 2:
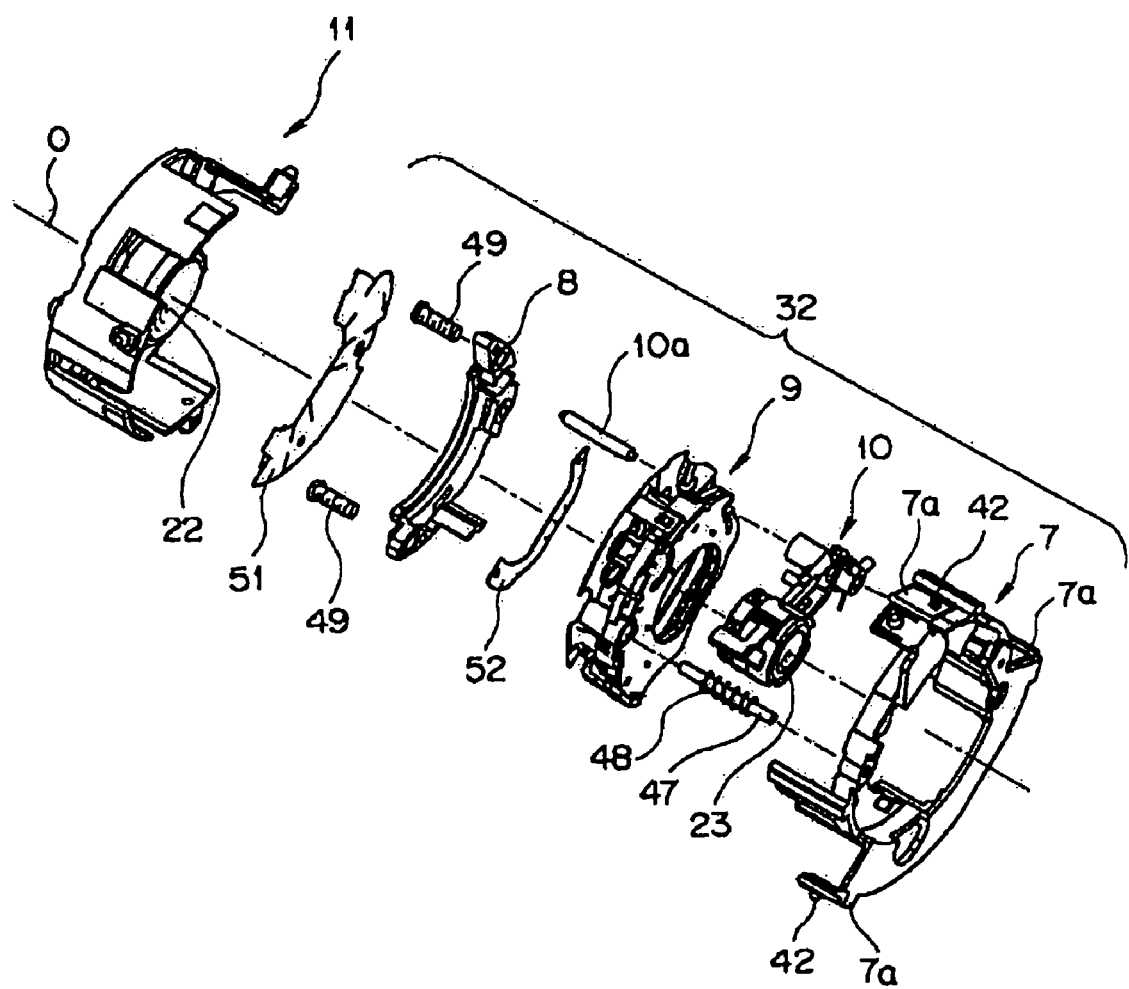
FIG. 2 is an exploded perspective view of a main part of a shutter/third group unit and a second group frame as shown in FIG. 1, being exploded.
Figure 3:
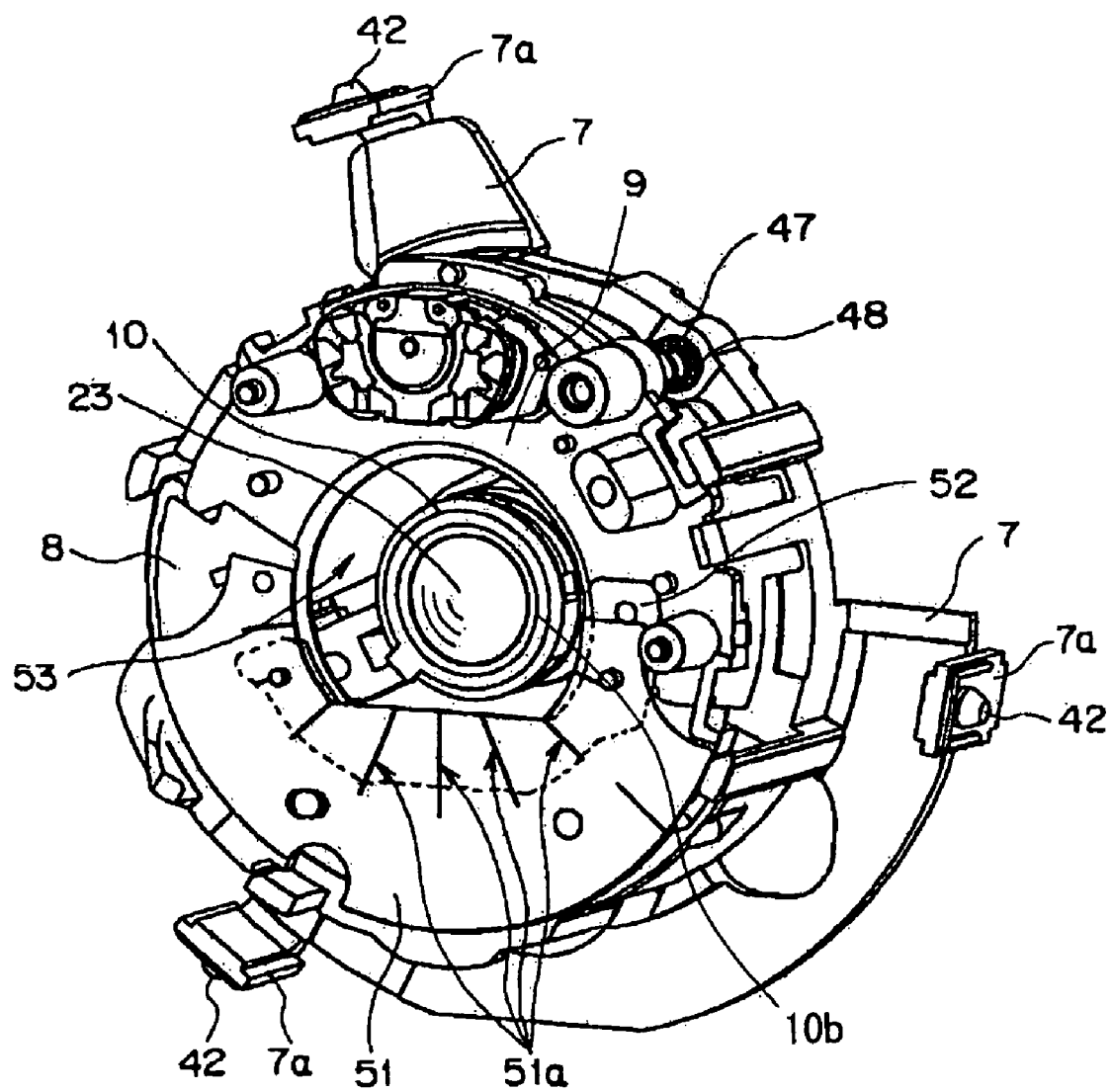
FIG. 3 is an enlarged perspective view of main parts of a shutter/third group unit as shown in FIG. 1, viewing from a front side thereof.
Figure 4:
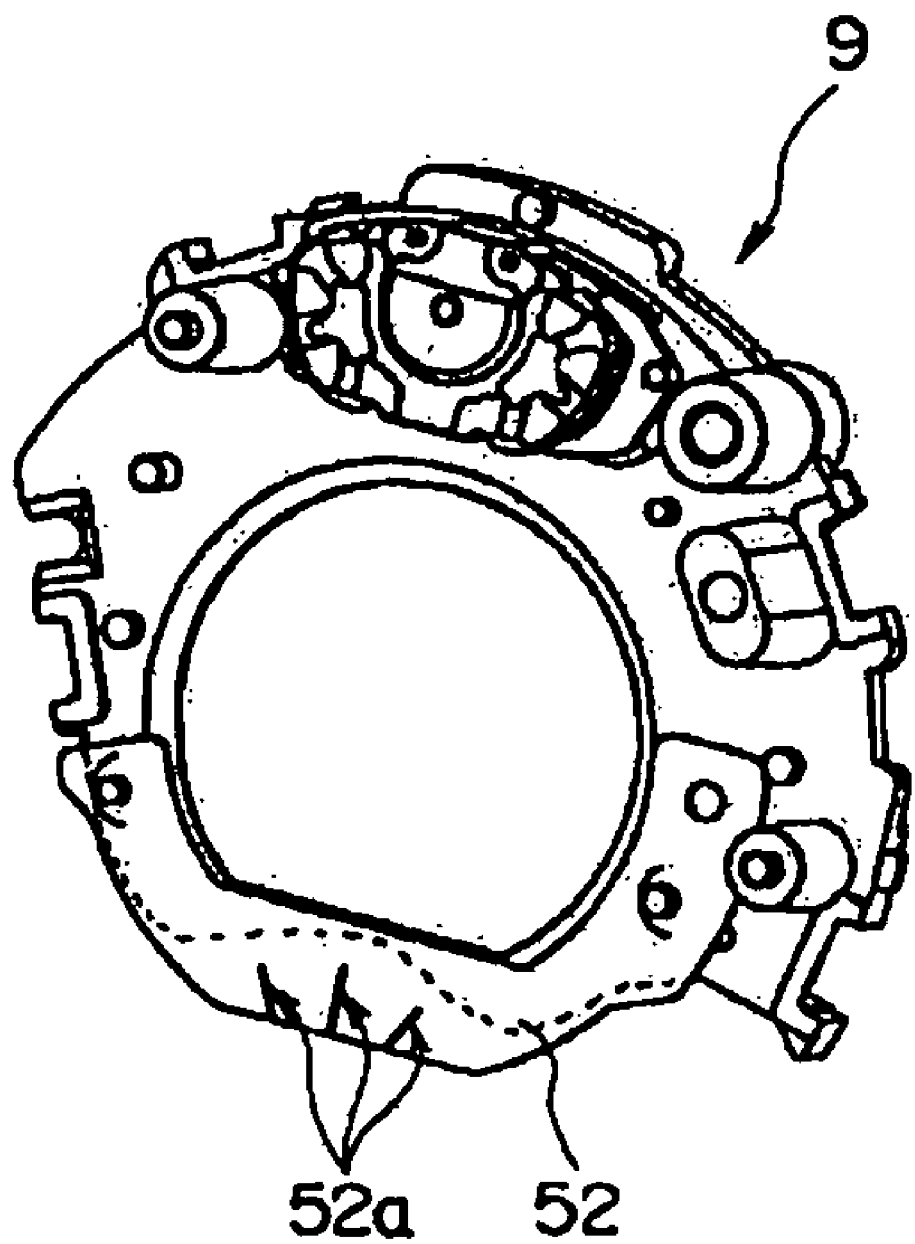
FIG. 4 is an enlarged perspective view of main parts of the shutter unit as shown in FIG. 3.
Figure 5:
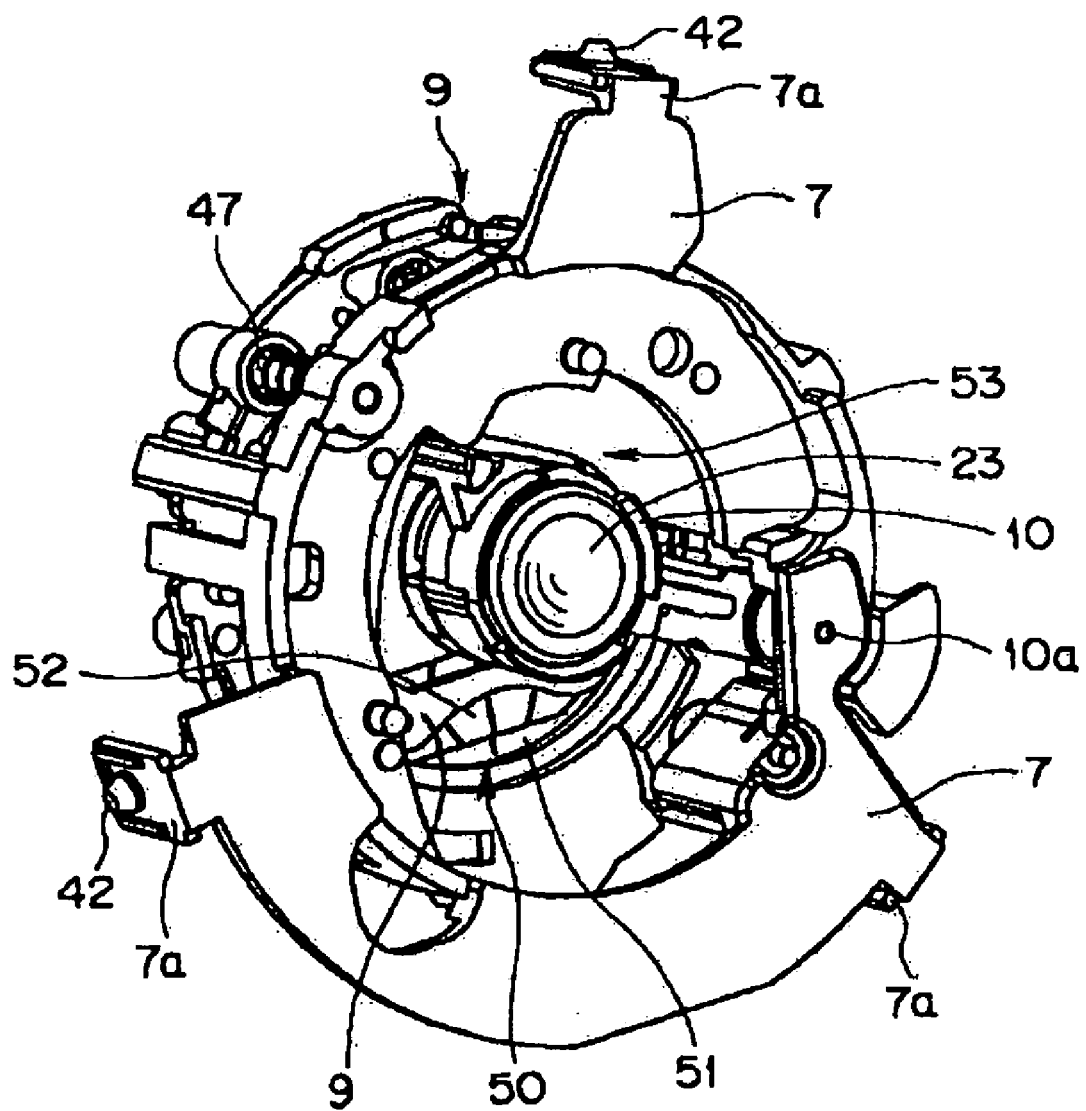
FIG. 5 is an enlarged perspective view of main parts of the shutter/third group unit, in an imaging standby position, viewing from a rear side thereof.
Figure 6:
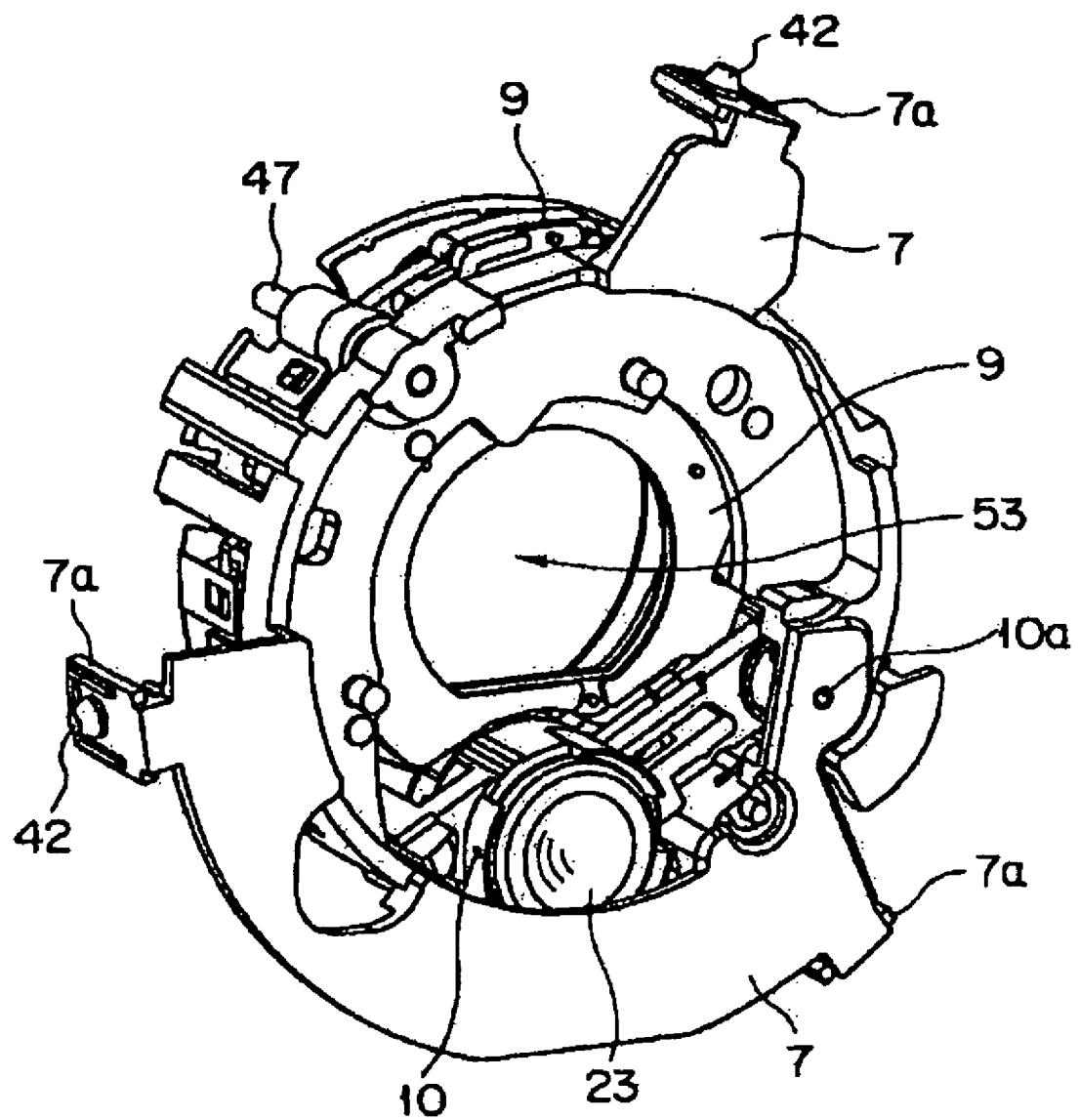
FIG. 6 is an enlarged perspective view of main parts of the shutter/third group unit, in a retracted position, viewing from a rear side thereof.
Figure 7:
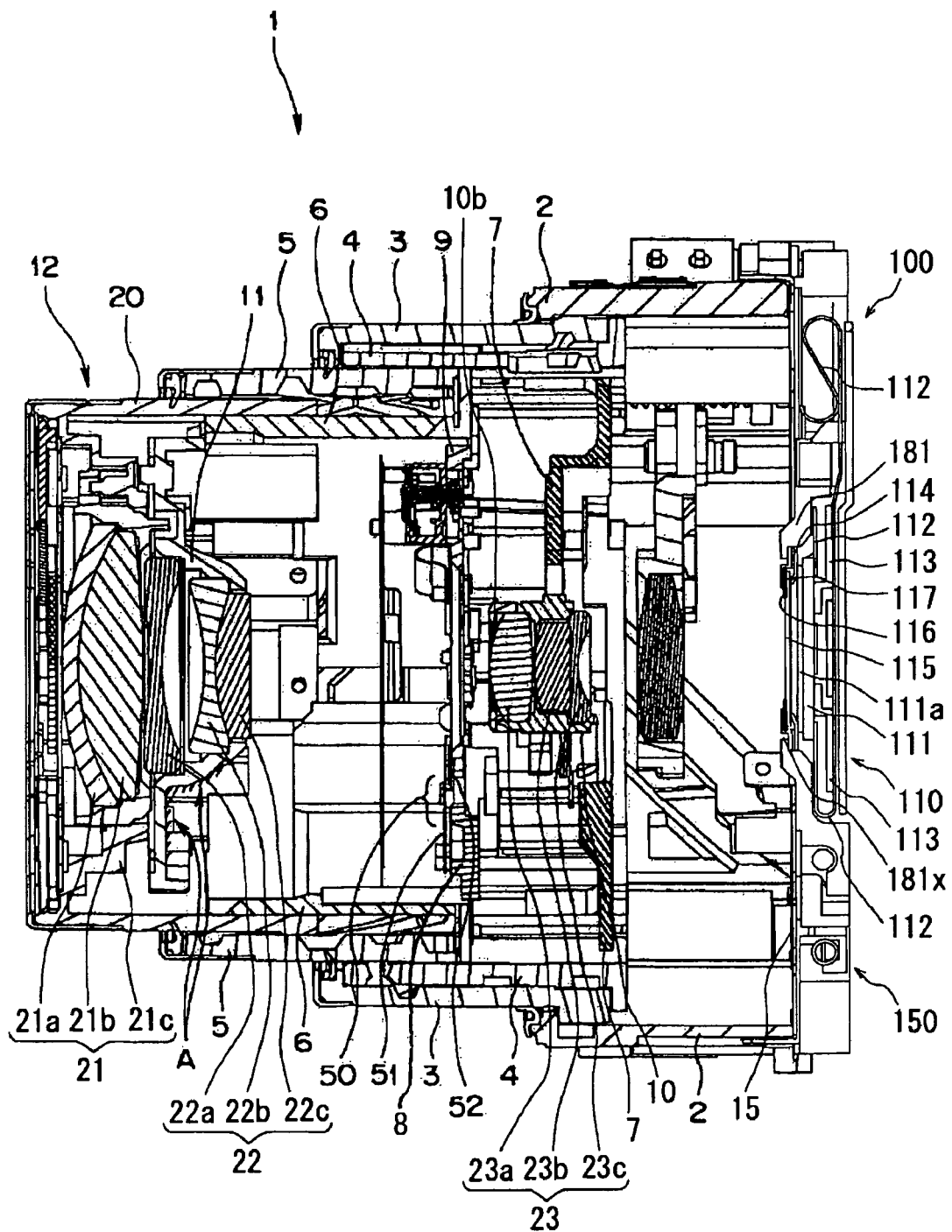
FIG. 7 is a cross-section view along a plane including an optical axis of the lens barrel in the imaging standby position.
Figure 8:
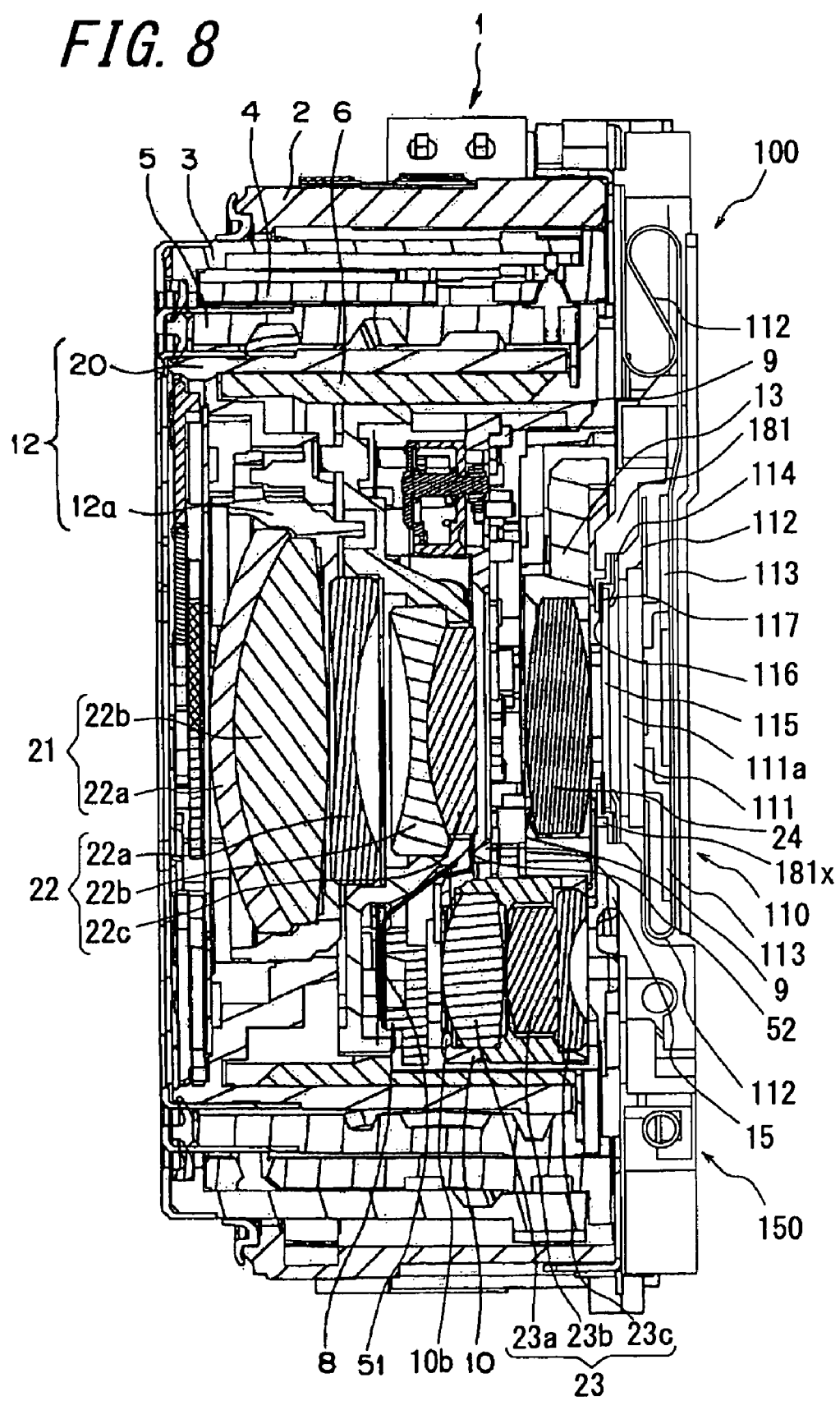
FIG. 8 is a cross-section view along a plane including an optical axis of the lens barrel in the retracted position.
Figure 9:
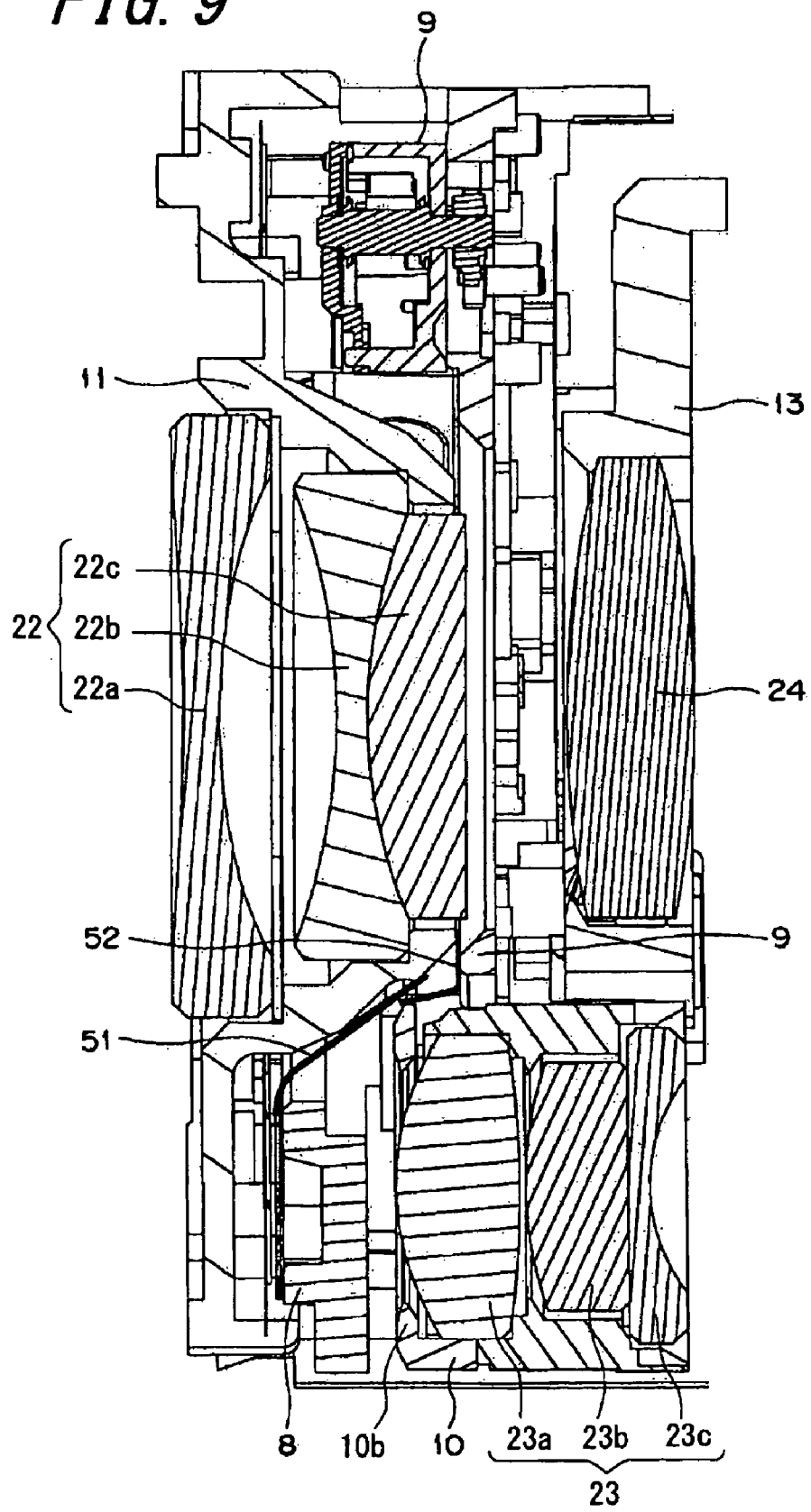
FIG. 9 is an enlarged perspective view of main parts of FIG. 8.
Figure 10:
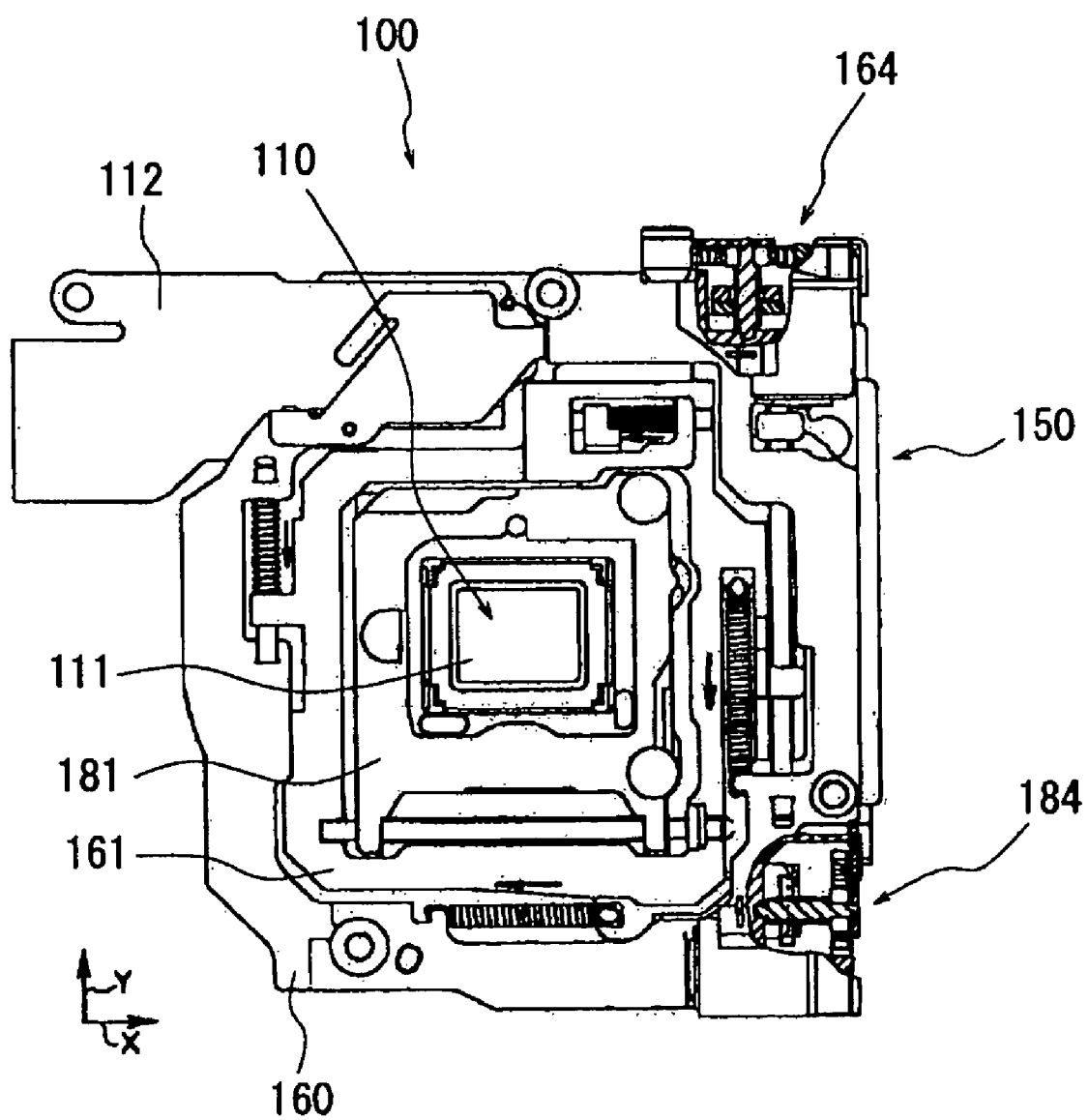
FIG. 10 is a plan view showing an imaging unit comprising an image blur compensating device as shown in FIGS. 7 and 8.

FIG. 1 is an exploded perspective view showing an arrangement of a lens barrel according to an embodiment of the present invention. FIG. 2 is an exploded perspective view of main part of a shutter/third group unit and a second group frame as shown in FIG. 1, being exploded. FIG. 3 is an enlarged perspective view of main parts of a shutter/third group unit as shown in FIG. 1, viewing from a front side thereof. FIG. 4 is an enlarged perspective view of main part of the shutter unit as shown in FIG. 3. FIGS. 5 and 6 are enlarged perspective views of main parts of the shutter/third group unit, in an imaging standby state and a retracted state, respectively, viewing from a rear side thereof. FIGS. 7 and 8 are cross sectional views along a plane including an optical axis of the lens barrel optical axis in the imaging standby state (wide spread position) and a retracted state, respectively. FIG. 9 is an enlarged perspective view of main parts of FIG. 8. FIG. 10 is a plan view showing an imaging unit comprising an image blur compensating device as shown in FIGS. 7 and 8.

In the description below, the optical axis of imaging optical system in the lens barrel is indicated with a reference symbol O. A subject side (object side) is defined as a foreside in the direction of the optical axis O, and an extending direction is defined as the direction when each frame member of the lens barrel moves forward. On the other hand, an imaging side (image side) is defined as a backside along the optical axis O, and a retracting direction is defined as the direction when each frame member of the lens barrel moves backward. In addition, a rotation direction of each constituting member of the lens barrel is represented as the rotation direction viewed from the foreside.

An electronic camera according to this embodiment uses an extensible imaging lens, i.e. a lens barrel. This lens barrel is a zooming lens barrels comprising a mechanism for extending and retracting between an imaging standby state and a non-actuated or retracted state. In the imaging standby state (imaging enabled position) capable of taking an image or waiting an action of taking an image, the lens barrel extends forward along the optical axis O to be elongated. In the latter or the retracted state, the lens barrel retracts along the optical axis O to be shortened as compared with the extending state, and to be stored in the electronic camera body as a retracted state, in which the lens barrel is not used for an imaging operation. Further, in the imaging standby position, changing a scaling factor (or zooming operation) is available by extending or retracting a plurality of frame members between a short focus position (wide field position) and a long focus position (telescopic field position).

First, the arrangement of lens barrel will be now described with reference to FIGS. 1 to 6.

The lens barrel 1 according to this embodiment of the present invention comprises: a stationary frame 2 fixed to a camera body (not shown); a rotary frame 3 to be rotated and moved back and forth by a force of a driving motor 17a which is supported by the stationary frame 2, and acting as a driving source during a zooming or retracting operation; a movable frame 4, capable of moving back and forth in the optical axis direction, and rotatable with a back and forth movement relative to the rotary frame 3 along optical axis O being restricted; a cam frame 5 which can rotate integrally with the rotary frame 3 and move back and forth relative to the rotation frame 3 along the direction of optical axis O; a linear guide frame 6 which can move back and forth along the direction of optical axis O with the cam frame 5 with rotation being restricted; a shutter/third group unit 32, which is driven by the rotary frame 3 to move back and forth along the direction of optical axis O under rotation restricted state and, which includes a shutter mechanism and a third group frame 10 as a retraction lens frame therein; a second group frame 11 and a first group frame 12, which are driven by the cam frame 5 to moved back and forth along the direction of optical axis O under a rotation restricted state, respectively; a fourth group frame 13, which is a focusing lens frame driven to move back and forth along a direction of optical axis O during focusing and retracting operation, first group lenses 21 (not shown in FIGS. 1 to 6, but refer to FIGS. 7 and 8 set forth below) retained by a first group frame 12; second group lenses 22 retained by the second group frame 11; third group lenses 23 retained by the third group frame 10; an imaging optical system comprising fourth group lenses 24 of focusing lenses retained by the fourth group frame 13; and, a retaining plate 15 fixed to a rear end of the stationary frame 2.

The stationary frame 2 is formed into a cylindrical shape, the inner periphery of which is provided with a cam groove 2a comprising a slant cam groove inclined to the optical axis O and a circumferential circular groove connected with the end of the slant cam groove, and linear grooves 2b and 2c parallel to the optical axis O.

The outer periphery of the fixed frame 2 is provided with a zooming unit 17 and a focusing unit 18: said zooming unit 17 comprising; a zooming motor as an unit for operating zooming action of the imaging optical system and as a zooming drive source; a gear train for transmitting the driving force of the zooming motor; long gears; and the like: and said focusing unit 18 comprising; a focusing motor as an unit for focusing action of imaging optical system and as focusing driving source; a gear train for transmitting the driving force of the focusing motor; feeding screws; guiding axis; and the like.

The zooming unit 17 is a zoom-driving mechanism, which drives the zooming optical system (the first group lenses 21, the second group lenses 22, and the third group lenses 23) of the imaging optical system of the lens barrel 1 contributing to a zooming action in the direction along optical axis O by means of the zooming motor. In addition, it performs also a retracting action for driving the lens barrel 1 from the imaging standby state to the retracted state.

A focusing unit 18 serves as a focusing drive mechanism, which drives the focusing optical system (the fourth group lenses 24) of the imaging optical system of the lens barrel 1 contributing to a focusing action in a direction along optical axis O by means of the focusing motor.

A long gear of the zooming unit 17, which is not shown in the drawings, with its gear rotating axis being parallel to the optical axis O, is rotatably supported by the stationary frame 2, while the peripheral part of the ling gear state extends inwardly from the inner periphery of the stationary frame 2.

A rotary frame 3 is formed as a cylindrical shape and inserted in the inner periphery of the stationary frame 2 to rotate and move back and forth. The rear part of an outer periphery of the rotary frame 3 is formed with a cam follower 3a slidably fitted in the cam groove 2a, and a gear part 3b meshed with the long gear.

The inner periphery of the rotary frame 3 comprises the third group cam grooves 3d formed in a inclined manner relative to the optical axis O, and a linear groove 3c for the cam frame formed in a parallel manner to the optical axis O. The linear groove 3c for the cam frame causes a cam frame 5 to move along the optical axis O relatively to the rotary frame 3, while rotating the cam frame 5 and the rotation frame 3 together, due to engagement with a cam follower 41 of a cam frame 5, which will be mentioned hereinafter.

Moreover, the rear end of the inner periphery of the rotation frame 3 is provided with a plurality of bayonet lugs 3e to sandwich the linear groove 3c for the cam frame. Such bayonet lugs 3e are provided for connecting the rotary frame 3 and the movable frame 4 together in a bayonet-joint manner by being fitted into a circumferential groove 4e of the movable frame 4, as mentioned below. Thus, with the rotary frame 3 and the movable frame 4 being connected in a bayonet joint manner, the movable frame 4 can rotate freely on the inner periphery of the rotation frame 3 and the movable frame 4 is restricted in its movement along the optical axis O with respect to the rotary frame 3.

As mentioned above, the cam follower 3a of the rotary frame 3 is slidably fitted into the cam groove 2 of the stationary frame 2, and the gear part 3b is engaged with the long gear. Thus, when the zooming motor of the zooming unit 17 is driven to rotate the long gear, its driving force is transmitted to the rotary frame 3 via the gear part 3b, whereby the rotation frame rotates. Rotation of the rotary frame 3 causes the cam follower 3a of the rotary frame 3 to move along the inclined cam groove part of the cam groove 2a of the stationary frame 2, so that the rotary frame 3 is telescopically extended forward from the retracted state to the short focus position of the imaging standby state. Moreover, when the lens barrel 1 is in the imaging standby state, the rotary frame 3 is only allowed to rotate while the movement in the direction along the optical axis is restricted, by means of the cam follower 3a and the circumferential groove of the cam groove 2a, during a zooming action between the short focus position and the long focus position.

A movable frame 4 is formed as a cylindrical shape, fitted into the inner peripheral part of the rotary frame 3, and rotatable relative thereto. The movable frame 4 is provided with a guide lug 4a to protrude from the outer periphery at the rear end of the moving frame 4 to be fitted into the linear groove 2b of the stationary frame 2. Thereby, the movable frame 4 can moves in the direction along the optical axis O while rotation being restricted.

The movable frame 4 is also provided with a linear groove 4b for the third group formed in the direction along the optical axis O, a cam groove 4c for a cam frame formed in a direction inclined with respect to the optical axis O, and a circumferential bottomed groove 4e formed in a rear part of the outer periphery thereof. Both the linear groove 4b for the third group and the cam groove 4c for the cam frame are through-grooves extending from the inner to the outer peripheries.

This movable frame 4 is arranged such that it is fitted into the inner periphery of the rotation frame 3 with the bayonet lug 3e of the rotation frame 3 being fitted into the circumferential groove 4e. Thereby, the movable frame 4 is connected with the rotary frame 3 in a bayonet joint manner, so that it can rotate relative to the rotary frame 3, while it cannot move relatively to the rotation frame 3 along the direction of optical axis O.

The movable frame 4 is also provided at the inner periphery thereof with a linear groove 4d, which is extended along the direction of the optical axis O, and is adapted to restrict rotation of a linear guide frame 6 by receiving a guide lug 6a of the linear guide frame 6, as mentioned below.

A cam frame 5 is formed as a cylindrical shape and arranged to fit into the inner periphery of the movable frame 4. This cam frame 5 has a cam follower 41 protruding outward from the back part of the outer periphery. The cam frame 5 is provided at the inner periphery thereof with a cam groove 5a for the second group and a cam groove 5b for the first group, formed in a direction inclined to the optical axis O.

The cam follower 41 of the cam frame 5 is slidably engaged with the cam groove 4c for the cam frame of the movable frame 4 and extends therethrough in the engaged state, and the edge of the cam follower 41 is fitted into and supported by the linear groove 3c of the rotation frame 3 for the cam frame. Thereby, the cam frame 5 is supported by the rotary frame 3 such that it can rotate together with the rotation frame 3 and move along the direction of the optical axis O relative to frame 3.

A linear guide frame 6 is formed as a cylindrical shape and is provided at the back part of the outer periphery thereof with a guide lug 6a fitted into linear groove 4d of the movable frame 4. The linear guide frame 6 also comprises: a linear groove 6b for the second group, which extends therethrough from the inner periphery to the outer periphery along the direction of the optical axis O; a bottomed linear groove 6c for the first group, which is formed on the outer periphery in the direction along the optical axis O; and a notch shaped cam part 6e, which drives a barrier driving lever (not shown) formed at the forward part.

The linear guide frame 6 is arranged such that it fits into the inner periphery of the first group frame 12 located on the inner side of the cam frame 5. In this case, the guide lug 6a of the linear guide frame 6 is fitted into the linear groove 4d of the movable frame 4. Thereby, the linear guide 6 is supported by frame 4 such that it can move back and forth, while being restricted in its rotation. A guide lug part (not shown) of the first group frame 12 fits into the linear groove 6c for the first group of the linear guide frame 6. Thereby, the linear guide frame 6 supports the first group frame 12 such that it can move back and forth, while being restricted in its rotation.

The linear guide frame 6 is rotatable relative to the cam frame 5 and moves together with the cam frame 5 in the direction along the optical axis O.

The second group frame 11 is formed as a cylindrical shape and arranged such that it fits into the inner periphery of the linear guide frame 6. The second group frame 11 retain substantially at the center thereof the second group lens 22, and comprises a guide lug 11a protruding outward from the outer periphery thereof and a cam follower 43 protruding outward from the guide lug 11a.

The guide lug 11a is adapted to fit into the linear groove 6b for the second group of the linear guide 6, and the cam follower 43 extends through the linear groove 6b for the second group and fits slidably into the cam groove 5a for the second group of the cam frame 5 outside of the linear guide 6. Thereby, the second frame 11 is driven to move back and forth by the cam frame 5, while being restricted in its rotation by the linear guide frame 6.

The first group frame 12 comprises a cylindrically shaped frame member 20, a first lens group retaining frame 12a (not shown in FIGS. 1 to 6, see FIGS. 7 and 8) retaining the first lens group 21 (see FIGS. 7 and 8) within the frame member 20 and the like. The first group frame 12 is arranged such that it fits into the inner periphery side of the cam frame 5, and is outside the outer periphery of the linear guide frame 6.

The first group frame 12 is provided at its front and inner side thereof with a lens barrier 27, which can open and close the front face of the first group lens 21. Further, the first group frame 12 is provided at its inner periphery thereof with a plurality of (for example, three) guide lugs (not shown) formed along the optical axis, protruding inward, and circumferentially distributed in equally spaced apart each. Furthermore, the first group frame 12 is provided with a cam follower 44 engaging with the cam groove 5b for the first group and protruding outward from the rear end of outer periphery of the first group frame 12 in the portion corresponding to these guide lugs.

As mentioned above, the guide lug of the first group frame 12 fits into the linear groove 6c for the first group of the linear guide frame 6. Thereby, the first group frame 12 is driven to move back and forth in the direction along the optical axis O by the cam connection between cam follower 44 and the cam groove 5b, while being restricted in its rotation by the linear guide frame 6.

Lens barrier 27 are rotatably supported at the front end of the first group frame 12 such that it is driven to open and close by a barrier driving lever (not shown) rotatably supported in a spring-loaded manner. This barrier lever drives the lens barrier 27 toward a closing direction in response to rotation movement induced by the notch shaped cam part 6e of linear guide frame 6 upon the retracting movement of the lens barrel 1.

As shown in FIGS. 2 to 6 in detail, a shutter/third group unit 32 comprises: a linear frame 7 for the third group at the rear end thereof; a shutter frame 9 retaining a shutter mechanism; a third group frame 10 retaining a third group lens 23; a pressure plate member 8; a first light-shielding sheet 51 as a first flexible member; and the second light-shielding sheet 52 as a second flexible member.

The linear frame 7 for the third group comprises a substantially circular-shaped plate member, which is formed with an opening substantially in the center thereof to allow a imaging light flux to pass through. In addition, the linear frame 7 for the third group is formed with arms extending outwardly in three directions, each free end of which arms is provided with guide lug 7a, respectively. Each guide lug 7a is provided with a cam follower 42 outward protruding radially therefrom.

The linear frame 7 for the third group is arranged such that it fits into the movable frame 4, and the guide lugs 7a thereof fit into and extend through the linear grooves 4b for the third group, and thereby, the cam followers 42 fit into the cam grooves 3d for the third group of the rotary frame 3. Thus, the linear frame 7 for the third group is driven back and forth by the rotation frame 3, while being restricted in its rotation by the movable frame 4.

The linear frame 7 for the third group is provided at the front surface thereof with a shutter frame 9, which is arranged to sandwich a third group frame 10. This third group frame 10 comprises an aperture diaphragm 10b provided at the front end of a retaining portion of the third group lens 23, and is disposed in the space between the linear frame 7 for the third group and the shutter frame 9, while being restricted in its movement in the direction along the optical axis O with respect to the linear frame 7 for the third group.

Particularly, the third group frame 10 is pivotally supported on the linear frame 7 for the third group by a supporting axis 10a embedded thereto so as to forwardly protrude in the direction along the optical axis O, so that the third group frame 10 can rotate (swing) in the direction perpendicular to the optical axis. Thereby, the third frame 10 is supported by the supporting axis 10a such that it can pivotally moved between a position where the third group lens is located on the optical axis O (the state as shown in FIG. 5), and a position where the third group lens is retracted from the optical axis O (the state as shown in FIG. 6).

Thus, the linear frame 7 for the third group is formed so as to have sufficient retraction space for allowing the third group frame to retract from a light path of the imaging light flux, when the third frame 10 rotates from the position on the optical axis to the position out of the optical axis.

As shown in FIG. 4, the shutter frame 9 is arranged in such a manner that a substantially circular-shaped plate member with an opening substantially in the center thereof retains a shutter mechanism, which comprises shutter vanes for opening and closing a central opening, a shutter actuator to drive these shutter vanes to rotate and the like.

This shutter frame 9 is pivotally supported on the linear frame 7 for the third group by a supporting axis 47 embedded thereto so as to forwardly protrude in the direction along the optical axis O, so that the shutter frame 9 can move back and forth in the direction along the optical axis, with respect to the straight frame 7. A coil spring 48 is winded around the supporting axis 47. With being compressed, this coil spring 48 is arranged between the shutter frame 9 and the linear frame 7 for the third group. Thus, the shutter frame 9 is always biased forward by the expanding power of the coil spring 48, to be apart from the linear frame 7 for the third group.

As shown in FIG. 4, the second light light-shielding sheet 52 (the second flexible member) is adhered to the predetermined portion in the front surface of the shutter frame 9.

In front of the shutter frame 9, the pressure plate member 8 is fixed to the straight frame 7 for the third group so as to sandwich the shutter frame 9 in the direction of optical axis by using several screws 49 (see FIG. 2), so that the shutter frame 9 is restricted its forwardly moved position in the direction of optical axis. Together with this pressure plate member 8, the linear frame 7 for the third group constitutes the second frame member. As shown in FIG. 3, the first light-shielding sheet 51 (the first flexible member) is adhered to the front surface of the pressure plate member 8 in the optical axis direction.

The first and second light-shielding sheet 51 and 52 may be formed as a flexible sheet of black colored material, for example polyethylene terephthalate (PET), polyester and the like.

On the other hand, when the shutter frame 9 is fixed to the linear frame 7 for the third group, a light path is formed for imaging light flux to pass through the central openings in communication with each other. The third frame 10 will be located onto the optical axis when the lens barrel 1 is in the imaging standby state.

In such a circumference, at the linear frame 7 of the third group an opening (notch), as shown with reference numeral 50 in FIG. 5, is formed between the linear frame 7 for the third group and the shutter frame 9, due to the construction for generating a space for the third frame to retract. Thereby, it may be concerned that undesired light beams, which are other unnecessary light beams except for those passing through the third lens 23 of the third frame 10 arranged on the light path, may also pass through the opening 50 from the front of the imaging lens to the back thereof and get into the optical path.

According to an embodiment of the present invention, therefore, the first light-shielding sheet 51 and the second light-shielding sheet 52 are adhered to predetermined portions in the pressure plate member 8 and the shutter frame 9 respectively, such that the opening 50 is closed by the first light-shielding sheet 51 and the second light-shielding sheet 52, when the lens barrel 1 is in the imaging standby state.

As shown in FIG. 5, the first light-shielding sheet 51 adhered to the pressure plate member 8 is arranged to close substantially the bottom half of the opening 50. The second light-shielding sheet 52 adhered to the shutter frame 9 is arranged to close substantially the top half of the opening 50. Both light-shielding sheets are then arranged such that parts of the first light-shielding sheet 51 and the second light-shielding sheet 52 are overlapped with each other.

To this purpose, the first light-shielding sheet 51 is arranged such that part of the first light-shielding sheet 51 protrudes from the inner rim of the pressure plate member 8 toward a central opening 53 defined by the shutter frame 9 and linear frame 7 for the third group so as to close part of the central opening 53. The second light-shielding sheet 52 is arranged such that part of the second light-shielding sheet 52 protrudes from the outer rim of the shutter frame 9 toward the central opening 53 defined by the shutter frame 9 and linear frame 7 for the third group so as to close a part of an opening 53.

As described above, the first light-shielding sheet 51 and the second light-shielding sheet 52 are made of flexible materials. Thereby, the first light-shielding sheet 51 can deform into a predetermined form of bent-shaped by contact with a predefined portion (as shown with a reference symbol A in FIG. 7, mentioned below) at the rear edge of the second group frame 11, when the lens barrel 1 is shifted from the imaging standby state to the retracted state. At the same time, the second light-shielding sheet 52 can deform into a predetermined form of bent-shaped by contact with the third frame 10 retracting from optical path by shifting from the position on the optical axis to the position out of the axis, while the lens barrel 1 is shifted from the imaging standby state to the retracted state.

Moreover, the second light-shielding sheet 52 is so arranged to restore the first light-shielding sheet 51 into the state before its deformation, when the lens barrel 1 is shifted from the retracted state to the imaging standby state.

The first light-shielding sheet 51 and the second light-shielding sheet 52 are formed with a plurality of notch-shaped slits 51a and 52a for allowing each of light-shielding sheets 51 and 52 to bend along the respective members on which they are adhered, i.e. the inner edge of the pressure plate member 8 and the outer edge of the shutter frame 9, when they are bent by the predefined frame members, respectively. The shutter/third group unit 32 is so arranged as described above.

A fourth group frame 13 is a frame member for retaining the fourth group lens 24. The fourth group frame 13 is provided at the outer periphery thereof with a long arm 13e and a short arm 13f extending radially outward therefrom. The long arm 13e is formed with a bearing bore 13a for fitting a guiding spindle of the focusing unit 18 (not shown) nearby at the free end of the long arm 13e. The short arm portion 13f is formed with a guide lug 13b to be engaged with the linear groove 2c of the stationary frame 2, nearby at the free end of short arm 13f.

This fourth group frame 13 is arranged such that it fits into the rear portion of the inner periphery of the stationary frame 2, and is movable back and forth in the direction along optical axis O with respect to the stationary frame 2.

The fourth group frame 13 is driven to move along the direction of guide axis, i.e. the direction of the optical axis O, when the guide axis is rotated by a focus-driving source (focusing motor) of the focusing unit 18 via the gear array and the feeding screw. Thus, the fourth group frame 13 is so arranged to displace in the focusing position in the imaging standby state, and in the predetermined retracted position in the retracting action.

The fourth group frame 13 is provided, substantially at the center thereof, with an opening, in which the fourth group lens 24 is fixedly retained.

A retaining plate 15 comprises a sheet-metal member, and is attached to the rear end surface of the assembled lens barrel 1, for example by means of screws. The retaining plate 15 has an opening 15a substantially at its center. An imaging unit 100 (refer to FIGS. 7 and 8) is provided at the site of this opening 15a.

An arrangement of the imaging unit 10 will be now described with reference to FIGS. 7 to 10.

First, the lens arrangement will be explained. As mentioned above, the photographing optical system has, in order from the object side, the first group lens 21, the second group lens 22, the third group lens 23, and the fourth group lens 24. The third lens 23 has an aperture diaphragm 10b on the object side. The first group lens 21 has a positive refractivity and the second group lens has a negative refractivity. The third group lens 23 and the fourth group lens 24 have positive refractivity, respectively.

FIGS. 7 to 9 illustrate an example where each group lens is arranged as mentioned below. The first group lens 21 having a positive refractivity comprises, in order from the object side, a first negative Meniscus lens 21a with its convex surface being faced to the object side, and a second biconvex lens 21b, which are joined with each other. The second lens group 22 with negative refractivity comprises, in order from the object side, a third biconcave negative lens 22a, a forth biconcave negative lens 22b, and a fifth biconvex positive lens 22c, with the forth biconcave negative lens 22b and the fifth biconvex positive lens 22c being joined with each other. The third group lens 23 with a positive refractivity comprises, in order from the object side, a sixth biconvex positive lens 23a, a seventh biconvex positive lens 23b, and a eighth biconcave negative lens 23c, with the seventh biconvex positive lens 23b and the eighth biconcave negative lens 23c being joined with each other. The fourth group lens 24 having a positive refractivity comprised a single ninth biconvex positive lens. These lens arrangements are only exemplary, and any other lens arrangement would be available if the first group lens 21 has a positive refractivity, the second group lens 22 has a negative refractivity, the third group lens has a positive refractivity, and the fourth group lens has a positive refractivity, respectively. Thus, the second group lens 22 may be arranged by two lenses, such as an object side lens of the second group lens and an image side lens of the second group lens.

The third group lens 23 retractable from the imaging light path, has a smaller aperture as compared with the other lens groups, because the third group lens is retained by the third group frame 10 having aperture diaphragm 10b. Thereby, a lens retaining part of the third group lens 10 is also small. With regard to the other lens groups, the more the lens group is apart from the aperture diaphragm 10b, the larger the aperture of the lens will be. Thus, in the second group lens 22 comprising three lenses, their lens apertures become progressively larger in the following successive order; the fifth biconvex positive lens 22c, the forth biconcave negative lens 22b and the third biconcave negative lens 22a. In this embodiment, the third biconcave negative lens 22a of the second group lens 22 is an object side lens of the second group lens, and a joined lens comprising the forth biconcave negative lens 22b and the fifth biconvex positive lens 22c is an imaging side lens of the second group lens. The fourth lens 24 has a smaller lens aperture than the image side lens of the second group lens 22.

Secondly, the arrangement of the imaging unit 100 will be described with reference to FIGS. 7, 8, and 10. As shown in FIGS. 7 and 8, the imaging unit 100 is secured by means of screws to the rear end surface of the stationary frame 2 to which the retaining plate 15 is attached. Thus, the imaging unit 100 is fixedly retained at the rear side of the lens barrel 1.

The imaging unit 100 has the arrangement similar to that of an image-shake compensating device such as disclosed in JP2008048220 A. It comprises an imaging element unit 110 for receiving an optical image generated through the imaging optical system and generating an image data, and an image-shake compensating device 150 for displacing the imaging element unit 110 within a parallel plane with respect to a light receiving plane and performing an image-shake compensating action.

The imaging element unit 110 mainly comprises: an imaging element 111, such as CCD, for photoelectrically converting the received optical image and generating an image data; a flexible print circuit board 112 mounting the imaging element 111 and being connected thereto, and a retaining plate 113 for retaining the flexible print circuit board 112 at the rear side of the second movable frame 181 of the image-shake compensating device 150, as mentioned below.

The imaging element 111 is provided at the front side thereof with a cover glass 111a, the front side of which is provided with a frame-shaped closing member 114, low pass filter (LPF) 115, frame-shaped light-shielding sheet 116, and a frame-shaped LPF pressure plate 117.

The image-shake compensating device 150 mainly comprises: a base 160 as a basic component; a first movable frame 161 rotatably supported by the base 160; a second movable frame 181 for rotatably supporting the imaging element unit 110 displaceable relative to the first moving frame 161; a first driving mechanism part 164 being fixed to the base 160 and comprising a driving source and a driving mechanism for displacing a assembled unit including the first movable frame 161 mounted to the base 160, the second movable frame 181 and the imaging unit 110, in a direction along a arrow Y (see FIG. 10) perpendicular to the optical axis; and a second driving mechanism part 184 being fixed to the base 160 and comprising a driving source and a driving mechanism for displacing the second movable frame 181 and the imaging unit 110 in a direction of an arrow X (see FIG. 10) perpendicular to both of the optical axis and the direction of arrow Y.

The imaging element unit 110 is arranged such that it can be assembled from the rear side of the image-shake compensating device 150. Specifically, the retaining plate 113 for the imaging element is fixed to the second movable frame 181 by means of screws from the back side, while sandwiching the flexible print circuit board therebetween (181, 113). In this case, the light-receiving surface of the imaging element 111 of the imaging element unit 110 is so disposed as to face forward through an opening window 181x of the second movable frame 181.

Other detailed arrangement is same as the image-shake compensating device disclosed in the above JP2008048220A, so that further description is omitted herein.

Actions of the lens barrel 1 according to this embodiment configured as above will now be described below with reference to FIGS. 7 to 9.

As shown in FIG. 7, when the lens barrel 1 is in the imaging standby state each frame member is moved forward in the direction along the optical axis O, so that the whole length of the lens barrel 1 is extended.

As shown in FIG. 7, in this imaging standby state the second group frame 11 and the shutter/third group unit 32 are spaced apart from each other. Thus, each predetermined part of the shutter/third group unit 32, i.e. pressure plate member 8, the first light-shielding sheet 51 and the second light-shielding sheet 52 attached to the predetermined parts of the shutter frame 9, respectively, are so disposed as to close the opening 50 in an overlapping state each other.

When the lens barrel is shifted from the imaging standby state to the retracted state, first of all, the second frame 11 moves backward along the direction of optical axis O. Along with this movement, a predetermined portion A of the rear edge of the second group frame 11 makes contact with the first light-shielding sheet 51, and causes part of the inner edge of the first light-shielding sheet 51 toward the optical axis to bend and deform backward, as shown in FIGS. 8 and 9.

The second group frame 11 abuts with the shutter frame 9 and keeps this abutted state to drive the shutter frame 9 backward in the direction along the optical axis O against the biasing force of a coil spring 48. At the same time, the third group frame 10 displaces from the position on the optical axis O to the position out of the optical axis to retract from the optical path.

Consequently, the predetermined part of outer edge of the third frame 10 abuts with the second light-shielding sheet 52, and causes part of the lower edge of the second light-shielding sheet 52 to bend and deform forward, as shown in FIGS. 8 and 9. In this way, the lens barrel 1 reaches the retracted state.

According to this embodiment, the third group lens 23 comprising three lenses held by the third group frame 10, is retracted, viewed from the perpendicular direction to the optical axis, to the position between the object side end of the second group imaging side lens and the imaging side end of the fourth group lens 24, wherein the second group imaging side lens comprises the joined lens of the fourth group biconcave negative lens 22b and the fifth group biconvex positive lens 22c to form the second group lens. In this embodiment, the imaging side of the third group lens 23, i.e. the imaging side end of the biconcave negative lens 23c which is located at the rearmost position, is retracted to the position almost corresponding to the image side end of the fourth group lens 24, viewing from the direction perpendicular to the optical axis.

When the lens barrel 1 shifts from the retracted state to the imaging standby state again, the second group frame 11 moves forward along the direction of optical axis O. Along with this movement, the abutting state between the predetermined part A of the rear edge of the second group frame 11 and the first light-shielding sheet 51 is released. Consequently, the first light-shielding sheet 51 restores to its original planer plate shape by its own restoration force.

At the same moment, the shutter frame 9 moves forward along the direction of optical axis O. Thereby, the second light-shielding sheet 52 abuts with the deformed first light-shielding sheet 51 nearby the edge part to push the first light-shielding sheet 51 forward. As a result, the second light-shielding sheet 52 operates to restore the first light-shielding sheet 51 to its state before deformation.

Moreover, in the same time, the third group frame 10 is so displaced from the position out of the optical axis to the position on the optical axis O. Consequently, the abutting state between the predetermined part of the outer edge of the third frame 10 and the second light-shielding sheet 52 is released. Then, the second light-shielding sheet 52 restores to its original planer plate shape by its own restoration force. In this way, the lens barrel 1 reaches the imaging standby state as illustrated in FIG. 7.

As described above, the extendable lens barrel 1 of the present invention comprises: the first group frame 12 retaining the first group lens 21 having positive refractivity and being movable back and forth in the direction of optical axis O; the second group frame 11 retaining the second group lens 22 having negative refractivity in the position posterior to the first group lens 21 and being movable in the direction of the optical axis O; the third group frame 10 retaining the third group lens 23 having the aperture diaphragm 10b and a positive refractivity, in which the aperture diaphragm 10b and the third group lens 23 are placed in the rear position relative to the second group lens 22 in the imaging standby state, and retracted to the position out of the optical axis O, in the retracted state, and being movable in the direction along the optical axis O and pivotable in the direction perpendicular to the optical axis O, in the retracted state; the fourth group frame 13 retaining the fourth group lens 24 having a positive refractivity, and being movable in the direction of the optical axis O at the imaging side of the third group lens 23 in the imaging standby state; and wherein, the second group lens 22 having at least two lenses including the second group object side lens and the second group image side lens having smaller outer shape than the second object side lens; the fourth group lens 24 comprising lens of smaller outer shape than that of the second group object side lens; and the aperture diaphragm 10b and the third group frame 23 are retracted to the position between the object side end of the second group image side lens and the image side end of the fourth group lens 24, in the retracted state, viewing from the direction perpendicular to the direction of the optical axis.

Thereby, in the retracted state, the third biconcave negative lens 22a of the second group lens 22, which is the second object side lens and has a relatively larger aperture, and the third group lens 23 does not overlap, so that it is possible to make the aperture of the second group frame 11 smaller, and as a result, to also reduce the size of the lens barrel 1 in the direction of diameter. Moreover, in the above mentioned embodiment, the third lens 23 is retracted from the optical axis O in such a manner that the image side end of the eighth biconcave negative lens 23c located at the rearmost position is substantially aligned with the imaging side end of the fourth group lens 24. Consequently, it is possible to place the second lens 22 and the fourth lens 24 close to each other, so that the housing of electronic imaging device can be flattened.

In the retracted state, the third group lens 23 does not protrude from the image side end of the fourth group lens 24, so that it does not interfere with the image-shake compensating device 150. Therefore, the third group lens 23 is easily applied to the electronic imaging device with an image-shake compensating device.

The extendable lens barrel 1 of the embodiment according to the present invention comprises: the second group frame 11, which is the first frame member movable along the direction of the optical axis O; the linear frame 7 for the third group, which is the second frame member located behind the second group frame 11 on the optical axis and configured to be movable in the direction along the optical axis O relative to the second group frame; the shutter frame 9, which is the third frame member located between the second group frame 11 and the linear group frame 7 for the third group, having an opening for allowing undesired light to path therethrough from front side, being movable in the direction along the optical axis O relative to linear frame 7 for the third group, being spaced apart in the direction along the optical axis O with respect to the linear frame 7 for the third group in the imaging standby state, and being in the retracted state, located closer to the linear frame 7 for the third group compared to its location in the imaging standby state; the first light-shielding sheet 51, which is the first flexible member and fixed to the linear frame 7 for the third group so as to be located in front of the shutter frame and close the opening in the imaging standby state and so as to be bent by abutting with the second group frame 11 in the retracted state; and the second light-shielding sheet 52, which is the second flexible member, and fixed to the shutter frame so as to be located just behind the first light-shielding sheet 51 in the direction of imaging standby state, while overlapping with the first light-shielding sheet 51 to close at least a part of the opening, and so as to overlap and make contact with the bending edge of the first light-shielding sheet 51 in the retracted state.

The above opening is provided for avoiding the interference with the components existing in the region out of the optical axis within the lens barrel 1.

The lens barrel 1 further comprises the third group frame 10, which is the fourth frame member provided on the straight frame 7 for the third group as to be pivotable between the position on the optical axis O and the position out of the optical axis, wherein during the shift of the lens barrel 1 from the imaging standby state to the retracted state, the third group frame 10 shifts from the position on the optical axis O to the position out of the optical axis, to bend the second light-shielding sheet 52.

Further, the second light-shielding sheet 52 is so arranged as to restore the deformed first light-shielding sheet 51 into the state before its deformation during the shift of the lens barrel 1 form the retracted state to the imaging standby state.

Thus, the lens barrel 1 according to this embodiment is a lens barrel 1, which is so arranged as to be shortened in its length by displacing between the imaging standby state (usage state) and retracted state (non-usage state), and comprises a pair of light-shielding sheets (the first light-shielding sheet 51, the second light-shielding sheet 52) for shielding undesired light beams incoming from an opening defined in the structural reason between the frame members moving in the direction along the optical axis O, wherein when the lens barrel 1 is in the imaging standby state, the pair of light-shielding sheets is so located as to partially overlap with each other to close the opening, and when the lens barrel 1 is in the retracted state, each of the pair of light-shielding sheets is bent and stored in a deformed shape by the first frame member (the second group frame 11) which moves in a direction along the optical axis O and by the third group frame 10 retracting to the direction perpendicular to the optical axis, respectively.

In this way, when the lens barrel 1 is in the photographing standby status, the opening can be closed by the pair of light-shielding sheets including the first light-shielding sheet 51 and the second light-shielding sheet 52, so that it surely prevents any undesired light beam from incoming.

When the lens barrel 1 is in the collapsed status, the first light-shielding sheet 51 and the second light-shielding sheet 52 can be bent and stored in the deformed state, so that the lens barrel 1 can be in retracted state without any unnecessarily occupied space.

Further, although the opening 50 is provided for avoiding an interference with the third group frame 10, it also may be provided for avoiding interferences with other components within the lens barrel rather than a frame member such as the third group frame 10. For example, such a component may be an actuator such as a motor fixed within the lens barrel.

The present invention is not limited only to the above-described embodiment, and various amendment and alternatives can be made without parting from the spirit of the invention. For example, the inventive lens barrel can be applied not only to electronic imaging devices, but also to film cameras and the like.

INDUSTRIAL APPLICABILITY

According to the present invention, in the extendable lens barrel, the aperture diaphragm and the third group lens are so arranged as to retract into the position between the object side end of the second group image side lens having relatively smaller outer shape among the second group lenses and the image side end of the fourth group lens, viewing from the direction perpendicular to the optical axis direction, so that the size of lens barrel in a direction of diameter can be diminished. Thereby, when the inventive lens barrel is applied to a camera, its body size can be compact, and the lens barrel can easily be applied to an electronic imaging device with an image-shake compensating device.

What is claimed is:

1. An extendable lens barrel comprising:
a first group frame retaining a first group lens with a positive refractivity, and being movable in a direction of an optical axis;
a second group frame retaining a second group lens with a negative refractivity at an imaging side of the first group lens on the optical axis and being movable in the direction of the optical axis;
a third group frame retaining an aperture diaphragm and a third group lens with a positive refractivity, and being movable in the optical axis and pivotable in the direction perpendicular to the optical axis in such a manner that said aperture diaphragm and said third group lens can be positioned at the imaging side of the second group lens on the optical axis in a imaging standby state, and the aperture diaphragm and the third group lens are retracted to a position out of the optical axis, in the retracted state, in which the length of the lens barrel is shorter than that of in imaging standby state;
a fourth group frame retaining a fourth group lens with a positive refractivity and being movable in the optical axis direction at the imaging side of the third group lens on the optical axis in the imaging standby state; and,
said second group lens comprising at least two lenses, namely a second group object side lens and a second group imaging side lens having an outer shape smaller than that of the second group object side lens;
said fourth group lens comprising lenses with an outer shapes smaller than that of the second group object side lens;
said aperture diaphragm and said third group lens being so arranged to retract into the position between the object side end of the second group image side lens and the image side end of the fourth group lens.

2. The lens barrel according to claim 1, wherein the third group lens is arranged such that the image side end of the third group lens is retracted into the position substantially aligned with the image side end of the fourth group lens in the retracted state, in viewing from a direction perpendicular to the optical axis.

3. The lens barrel according to claim 1, comprising a second frame member, located behind a first frame member forming the second group frame and being movable along the direction of the optical axis relative to the first frame member;

a third frame member disposed between the first frame member and the second frame member and having an opening to allow undesired light beams to pass therethrough from front side toward the second frame member, which third frame member is movable in the direction of the optical axis relative to the second frame member, and movable apart from the second frame member in the direction along the optical axis relative to the second frame member in the imaging standby state, and which is located closer to the second frame member in the retracted state than in the imaging standby state;

a first flexible member, which is disposed in front of the third frame member and fixed to the second frame member so as to close the opening in the imaging standby state and so as to be bent by making contact with the first frame member in the retracted state;

a second flexible member, which is fixed to the third frame member so as to be located just behind the first flexible member in the optical axis direction for overlapping with the first flexible member to close at least a part of the opening in the imaging standby state, and for overlapping and making contact with the bending edge of the first flexible member in the retracted state.

4. The lens barrel according to claim 3, wherein the opening is provided for avoiding the interference with the components out of the optical axis within the lens barrel.

5. The lens barrel according to claim 3, wherein the second frame member is provided with a fourth frame member composing the third group frame in such a manner that said fourth frame member is pivotable between the position on the optical axis and the position out of the optical axis, and upon shifting from the imaging standby state to the retracted state, the fourth frame member is transferred from the position on the optical axis to the position out of optical axis so as to make contact with the second flexible member and to bend it.

6. The lens barrel according to claim 3, wherein the second flexible member can restore the first flexible member to its state before the deformation upon shifting to the imaging standby state.

7. An electronic imaging device comprising:

the lens barrel according to claim 1;

an imaging element disposed in an imaging side of the fourth group lens on the optical axis, for generating an image data by receiving images through the first group lens, the second group lens, the third group lens, and the fourth group lens; and an image-shake compensating device for performing an image-shake compensating action by displacing the imaging element in the plane parallel to a light receiving plane of the imaging element.

* * * * *